United States Patent
Wang et al.

(10) Patent No.: US 8,744,534 B2
(45) Date of Patent: Jun. 3, 2014

(54) METHODS AND APPARATUS FOR PRESERVING BATTERY RESOURCES IN A MOBILE COMMUNICATION DEVICE

(75) Inventors: Shiehlie Wang, Los Altos, CA (US); Ben-Heng Juang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 528 days.

(21) Appl. No.: 12/788,632

(22) Filed: May 27, 2010

(65) Prior Publication Data

US 2011/0269463 A1 Nov. 3, 2011

Related U.S. Application Data

(60) Provisional application No. 61/330,003, filed on Apr. 30, 2010.

(51) Int. Cl.
*H04W 52/02* (2009.01)
(52) U.S. Cl.
USPC ........... 455/574; 455/436; 370/477; 370/311; 370/252
(58) Field of Classification Search
USPC ................... 455/436, 574; 370/311, 477, 252
See application file for complete search history.

(56) References Cited

U.S. PATENT DOCUMENTS

| | | | |
|---|---|---|---|
| 6,058,289 A | 5/2000 | Gardner et al. | |
| 6,347,091 B1* | 2/2002 | Wallentin et al. | 370/437 |
| 6,480,476 B1 | 11/2002 | Willars | |
| 8,295,217 B2* | 10/2012 | Kone et al. | 370/311 |
| 2007/0206639 A1* | 9/2007 | Zhao et al. | 370/477 |
| 2008/0267148 A1* | 10/2008 | Speight | 370/338 |
| 2009/0124212 A1* | 5/2009 | Islam et al. | 455/70 |
| 2009/0141661 A1* | 6/2009 | Li et al. | 370/311 |
| 2009/0268689 A1* | 10/2009 | Fu et al. | 370/331 |
| 2009/0325533 A1* | 12/2009 | Lele et al. | 455/343.1 |
| 2010/0091693 A1 | 4/2010 | Pelletier et al. | |
| 2010/0118752 A1* | 5/2010 | Suzuki et al. | 370/311 |
| 2011/0319064 A1* | 12/2011 | Lenart et al. | 455/418 |
| 2012/0051289 A1* | 3/2012 | Dwyer et al. | 370/328 |
| 2012/0120815 A1* | 5/2012 | Anderson et al. | 370/252 |
| 2012/0120828 A1* | 5/2012 | Anderson et al. | 370/252 |
| 2013/0329551 A1* | 12/2013 | Brisebois et al. | 370/230 |

FOREIGN PATENT DOCUMENTS

| | | | |
|---|---|---|---|
| EP | 1798998 A1 | 6/2007 | |
| EP | 2061192 A1 | 5/2009 | |
| EP | 1981224 A1 | 4/2010 | |
| WO | WO 2010/047630 | 4/2010 | |
| WO | WO 2011/060998 | 5/2011 | |

OTHER PUBLICATIONS

International Search Report dated Aug. 5, 2011, in PCT Application No. PCT/US2011/033999.

(Continued)

*Primary Examiner* — Nay A Maung
*Assistant Examiner* — Erica Fleming-Hall
(74) *Attorney, Agent, or Firm* — Womble Carlyle Sandridge & Rice LLP

(57) ABSTRACT

Preserving battery resources in a wireless device in communication with a wireless network by dynamically aligning a RRC connection status of a mobile wireless communication device in communication with a wireless network with a data traffic profile. The data traffic profile indicating a pattern of data transfer between the mobile wireless communication device and the wireless network.

30 Claims, 14 Drawing Sheets

(56) References Cited

OTHER PUBLICATIONS

Written Opinion dated Aug. 5, 2011, in PCT Application No. PCT/US2011/033999.
European Search Report dated Nov. 15, 2011, in EP Application No. EP11164048.
Taiwan Patent Application No. 100114892—Office Action dated Nov. 25, 2013.
Singapore Patent Application No. 201207258-3—Office Action dated Feb. 1, 2014.
"Universal Mobile Communications System (UTMS); Radio Resource Control (RRC); Protocol specification (3GPP TS 25.331 version 8.10.0 Release 8)", 3GPP STANDARD; 3GPP ETSI TS 125.331, 3rd Generation Partnership Project (3GPP), Apr., 2010, p. 97; pp. 114-116; p. 264; pp. 529-530; pp. 543-546; pp. 570-574; pp. 577-583; pp. 584-589; pp. 637-642; pp. 651-653; pp. 1069-1070; p. 1680.
"Universal Mobile Telecommunications System (UTMS); Radio Resource Control (RRC); Protocol specification: 3GPP TS 25.331 version 9.1.0 (Release 9)", 3GPP Standard; 3GPP ETSI TS 125.331, 3rd Generation Partnership Project (3GPP), Feb. 2010, paragraph 11.1, pp. 1093-1098.

\* cited by examiner

METHODS AND APPARATUS FOR PRESERVING BATTERY RESOURCES IN A MOBILE COMMUNICATION DEVICE

CROSS REFERENCE TO RELATED APPLICATIONS

This U.S. patent application takes priority under 35 U.S.C. 119(e) entitled "METHODS AND APPARATUS FOR PRESERVING BATTERY RESOURCES IN A MOBILE COMMUNICATION DEVICE" by Wang et al., U.S. Provisional Patent Application No. 61/330,003, filed Apr. 30, 2010 which is also incorporated by reference in its entirety for all purposes.

TECHNICAL FIELD

The present disclosure relates to radio resource control between User Equipment (UE) or other wireless or mobile device and a wireless network, and in particular to transitioning between states and modes of operation in a UE in communication with a wireless network such as for example, a Universal Mobile Telecommunication System.

BACKGROUND

A Universal Mobile Telecommunication System (UMTS) is a broadband, packet based system for the transmission of text, digitized voice, video and multi-media. In a UMTS based network (or UTRAN, where UTRA stands for UMTS Terrestrial Radio Access), a Radio Resource Control (RRC) part of the protocol stack is responsible for the assignment, configuration and release of radio resources between the UE and the UTRAN. Two basic modes that the UE can operate are defined as "idle mode" and "UTRA RRC connected mode" (or simply "connected mode"). In idle mode, the UE is required to request a RRC connection from the UTRAN whenever it wants to send any user data or respond to a page for receiving data from an external data network such as a push server. When in a RRC connected mode, the UE can be in one of four states:

CELL-DCH: a dedicated channel is allocated to the UE in uplink and downlink in this state to exchange data;

CELL_FACH: no dedicated channel is allocated to the UE in this state; instead, common channels are used to exchange a small amount of bursty data;

CELL_PCH: the UE uses Discontinuous Reception (DRX) to monitor broadcast messages and pages via a Paging Indicator Channel (PICH) and no uplink activity is possible; and URA_PCH: this state is similar to CELL_PCH, except that URA UPDATE procedure is only triggered via UTRAN Registration Area (URA) reselection.

In IDLE state, when the UE requests an RRC connection, the network (NW) decides whether to move the UE to the CELL_DCH or CELL_FACH state. Conversely, when the UE is in an RRC connected mode, it is the network that decides when to release the RRC connection. The network may also move the UE from one RRC state to another prior to releasing the connection or in some cases instead of releasing the connection. The state transitions are typically triggered by data activity or inactivity between the UE and network. Since the network may not know when the UE has completed the data exchange for a given application, it typically keeps the RRC connection for some time in anticipation of more data to/from the UE. This is typically done to reduce the latency of call set-up and subsequent radio resource setup. The RRC connection release message can only be sent by the UTRAN that releases the signal link connection and all radio resources between the UE and the UTRAN.

The problem with the above arrangement is that even if an application on the UE has completed its data transaction and is not expecting any further data exchange, the UE must still wait for the network to move it to the correct state. The network may not be even aware of the fact that the application on the UE has completed its data exchange. Since the UTRAN controls when the RRC connected state is changed to a different state or into an idle mode and the UTRAN is not aware of the status of data 502 delivery between the UE and external server. Accordingly, the UE may be forced to stay in a higher data rate state or mode than what is required, resulting in decreased battery life for the UE and as well as the possibility of wasting network resources due to the fact that the radio resources are unnecessarily being kept occupied and are thus not available for another user.

Therefore, a method, apparatus, and system for improving power consumption in a wireless mobile communication device when wirelessly connected to a wireless network.

SUMMARY OF THE DESCRIBED EMBODIMENTS

This paper describes various embodiments that relate to methods to associate a mobile wireless communication device with network subsystems before initiating a connection of the mobile wireless communication device with a wireless communication network A method of conserving battery power in a wireless device in communication with a wireless network is carried out by performing at least the following operations. An operating state and an associated data traffic pattern of the wireless device are determined. The data traffic pattern is based upon a plurality of data uploads and downloads between the wireless device and the wireless network. A plurality of wireless device connection state transition timers are generated based upon the operating state and data traffic pattern where each of the plurality of wireless device connection state transition timers indicates an amount of time of data inactivity at the wireless device required to elapse before a connection state of the wireless device is changed. A wireless device connection state change request that includes at least one of the pluralities of wireless device connection state transition timers as a requested wireless device connection state transition timer is then sent to the network. When the network recognizes the wireless device connection state change request, the network issues an instruction to the wireless device to change the wireless device's connection state according to the requested wireless device connection state transition timer. Otherwise, the network issues instructions to the wireless device to change the wireless device connection state according to a network default connection state transition timer.

A method of conserving battery power in a wireless device in communication with a wireless network is described. The method is carried out by: determining an operating state of the wireless device, determining a data traffic pattern of a plurality of data uploads and downloads between the wireless device and the wireless network associated with the current operating state, determining a preferred wireless device connection state for the wireless device based upon the operating state and the data traffic pattern, and sending a wireless device connection state change request instruction (SCRI) to the network, the SCRI indicating the preferred wireless device connection state. The wireless network responds by sending a state change command that causes the wireless device to transition from a current wireless connection state to the preferred wireless connection state.

A mobile wireless device in communication with a wireless network, includes at least a processor, a battery, and a wireless transceiver arranged to facilitate the communication with the wireless network. In the described embodiment, the processor acts to conserve battery power by: determining an operating state of the wireless device, determining a data traffic pattern associated with the current operating state, the data traffic pattern comprising a plurality of data uploads and downloads between the wireless device and the wireless network, generating a plurality of wireless device connection state transition timers in accordance with preserving battery power based upon the operating state and data traffic pattern, wherein each of the plurality of wireless device connection state transition timers indicates an amount of elapsed time of data inactivity at the wireless device required before a connection state of the wireless device is changed, and sending a wireless device connection state change request to the network where the wireless device connection state change request includes at least one of the plurality of wireless device connection state transition timers. When the network recognizes the wireless device connection state change request, the network issues an instruction to change the wireless device's connection state according to a requested wireless device connection state transition timer, otherwise, the network issues instructions to the wireless device to change the wireless device connection state according to a network default connection state transition timers.

A mobile wireless device in communication with a wireless network is described that includes at least a processor, a battery, and a wireless transceiver arranged to facilitate the communication with the wireless network. The processor acts to conserve battery power by: determining an operating state of the wireless device, determining a data traffic pattern associated with the current operating state, the data traffic pattern comprising a plurality of data uploads and downloads between the wireless device and the wireless network, determining a preferred wireless device connection state for the wireless device based upon the operating state and the data traffic pattern, and sending a wireless device connection state change request instruction (SCRI) to the network, the SCRI indicating the preferred wireless device connection state. The wireless network responds by sending a state change command that causes the wireless device to transition from a current wireless connection state to the preferred wireless connection state.

Non-transistory computer readable medium for storing computer executable instructions for conserving battery resources in a wireless mobile communication device is described. The computer readable medium includes at least computer code for determining an operating state of the wireless device, computer code for determining a data traffic pattern associated with the current operating state, the data traffic pattern comprising a plurality of data uploads and downloads between the wireless device and the wireless network, computer code for generating a plurality of wireless device connection state transition timers in accordance with preserving battery power based upon the operating state and data traffic pattern, wherein each of the plurality of wireless device connection state transition timers indicates an amount of elapsed time of data inactivity at the wireless device required before a connection state of the wireless device is changed, and computer code for sending a wireless connection state change request to the network, the wireless device connection state change request including at least one of the plurality of wireless device connection state transition timers. When the network recognizes the wireless device connection state change request, the network issues an instruction to update a wireless device connection state transition timer to a requested wireless device connection state transition timer, otherwise, the network issues instructions to the wireless device to update the wireless device connection state transition timer to a network default connection state transition timers.

BRIEF DESCRIPTION OF THE DRAWINGS

The described embodiments and the advantages thereof may best be understood by reference to the following description taken in conjunction with the accompanying drawings.

DETAILED DESCRIPTION OF EMBODIMENTS

Figure 1:
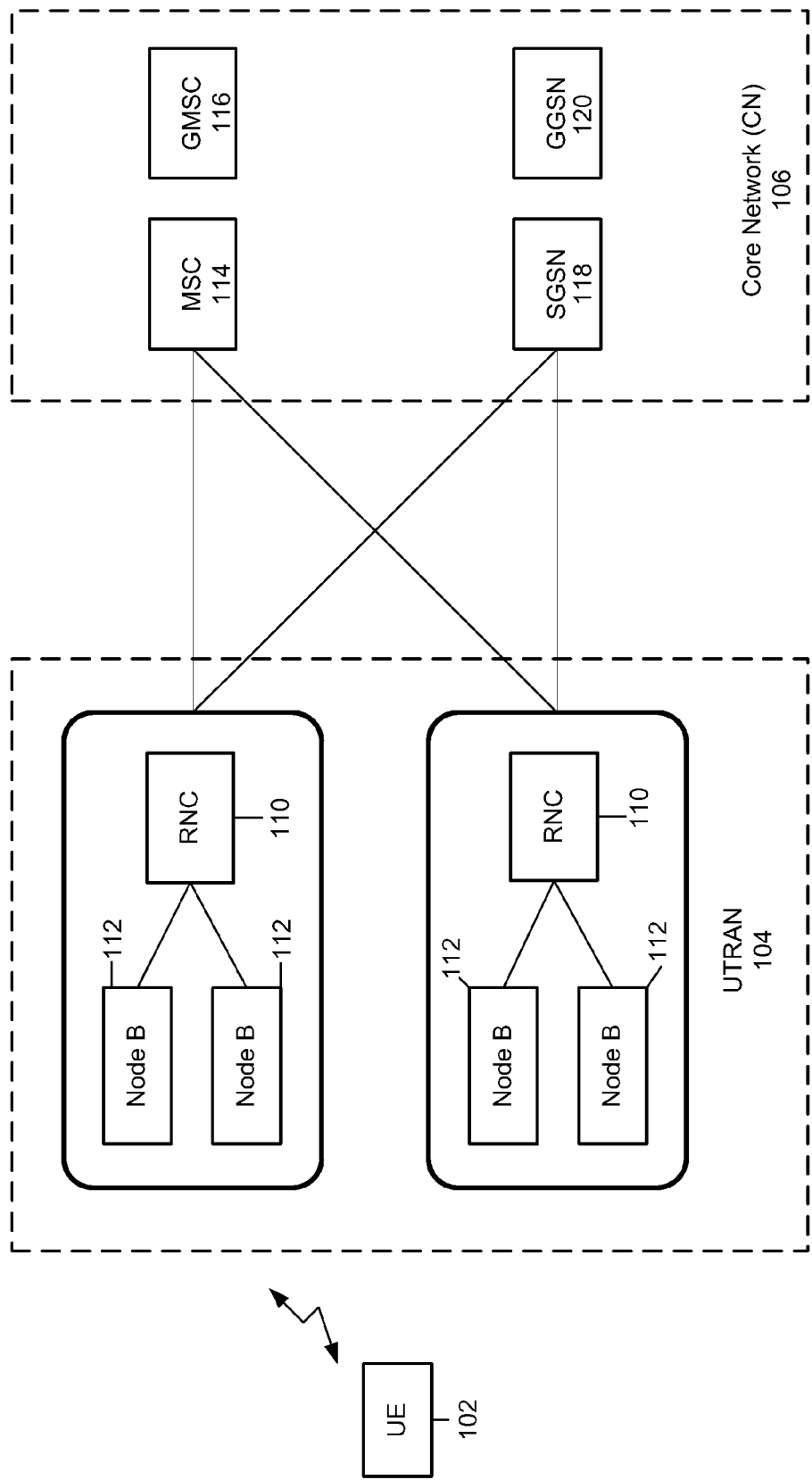
FIG. 1 illustrates an exemplary basic structure of a general UMTS Terrestrial Radio Access Network (UTRAN).

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and systems for transitioning a User Equipment (UE) or other mobile device between various states/modes of operation in a wireless network such as, for example, a UMTS network. It should be understood, however, that other implementations in other types of networks are also possible. For example, the same teachings could also be applied to a Code-Division-Multiple-Access (CDMA) network, Wideband-CDMA (W-CDMA) network, an Evolved UTRAN network (e.g. LTE), or by way of generalization, to any network based on radio access technologies that utilize network-controlled radio resources or that does not maintain any knowledge of the status of device application level data exchanges. The specific examples and implementations described below although presented for simplicity in relation to UMTS networks are also applicable to these other network environments. Further, the network element is sometimes described below as the UTRAN. However, if other network types besides UMTS are utilized, the network element can be selected appropriately based on the network type. Further, the network element can be the core network in a UMTS system or any other appropriate network system, where the network element is the entity that makes transition decisions.

In a particular example, the present system and method provide for the transitioning from an RRC connected mode to a more battery efficient or radio resource efficient state or mode while providing for decision making capabilities at the network. In particular, the present method and apparatus provide for transitioning based on receipt of an indication from a UE indicating, either implicitly or explicitly, that a transition of the RRC state or mode associated with a particular signaling connection with radio resources to another state or mode should occur. As will be appreciated, such a transition indication or request could utilize an existing communication under current standards using, for example, a non-critical extension of an existing message, such as a SIGNALING CONNECTION RELEASE INDICATION (SCRI) message that is used by the UE to indicate to the UTRAN that one of its signalling connections has been released that can, in turn, initiate the RRC connection release procedure. The transition indication originated by the UE can be sent in some situations when one or more applications on the UE have completed an exchange of data and/or when a determination is made that the UE application(s) are not expected to exchange any further data. The network element can then use the indication and any information provided therein to make a network specific decision about whether to transition the mobile device to another mode or state, or do nothing. The transition indication provided by the UE or mobile device can take several forms and can be sent under different conditions.

In one example, the transition indication can be sent based on a composite status of all of the applications residing on the UE. Specifically, in a UMTS environment, if an application on the UE determines that it is done with the exchange of data, it can send a "done" indication to a "connection manager" component of UE software. Based on a composite status of such indications from active applications, UE software can decide to send a transition indication to indicate or request of the network that a transition from one state or mode to another should occur. Whenever the connection manager determines with some probability that no application is expected to exchange data, it can send a transition indication to the network to indicate that a transition should occur. In a specific example, the transition indication can be a signaling connection release indication (SCRI) for the appropriate domain (e.g. PS domain) to request a transition to a battery efficient mode, such as IDLE state (unconnected). Alternatively, the transition indication could be a request for state transition within the connected modes to the UTRAN such as CELL-PCH or URA-PCH. It should be noted that when the UE sends a transition indication it can include additional information in order to assist the network element in making a decision to act on the indication. This additional information would include the reason or cause for the UE to send the message. Such additional information may be by way of a new information element or a new parameter within the transition indication message.

These and other embodiments are discussed below with reference to FIGS. 1-13. However, those skilled in the art will readily appreciate that the detailed description given herein with respect to these figures is for explanatory purposes only and should not be construed as limiting.

FIG. 1 illustrates an exemplary UMTS Terrestrial Radio Access Network 100 which is a collective term for base stations and radio network controllers. As shown in FIG. 1, UMTS network 100 is roughly divided into user equipment (UE) 102, a UTRAN 104, and a core network (CN) 106. UTRAN 104 includes one or more radio network sub-systems (RNS) 108 each of which includes a radio network controller (RNC) 110 and a plurality of Node-Bs (base stations) 112 managed by the RNC 110. RNC 110 handles the assignment and management of radio resources and operates as an access point with respect to the core network 106. Node-Bs 112 receive information sent by the physical layer of UE 102 through an uplink and transmit data to UE 102 through a downlink and can operate as access points of the UTRAN 104 for UE 102.

UTRAN 104 constructs and maintains a radio access bearer (RAB) for communication between UE 102 and the core network 106. In the described embodiments, the services provided to a specific UE 102 are roughly divided into the circuit switched (CS) services and the packet switched (PS) services. For example, a general voice conversation service is a circuit switched service, while a Web browsing service via an Internet connection is classified as a packet switched (PS) service. For supporting circuit switched services, RNCs 110 are connected to the mobile switching center (MSC) 114 of core network 106 and MSC 114 is connected to gateway mobile switching center (GMSC) 116 that manages the connection with other networks. For supporting packet switched services, RNCs 110 are connected to serving general packet radio service (GPRS) support node (SGSN) 118 and gateway GPRS support node (GGSN) 120 of core network 106. SGSN 118 supports the packet communications with RNCs 110 and GGSN 120 manages the connection with other packet switched networks, such as the Internet.

Figure 2:
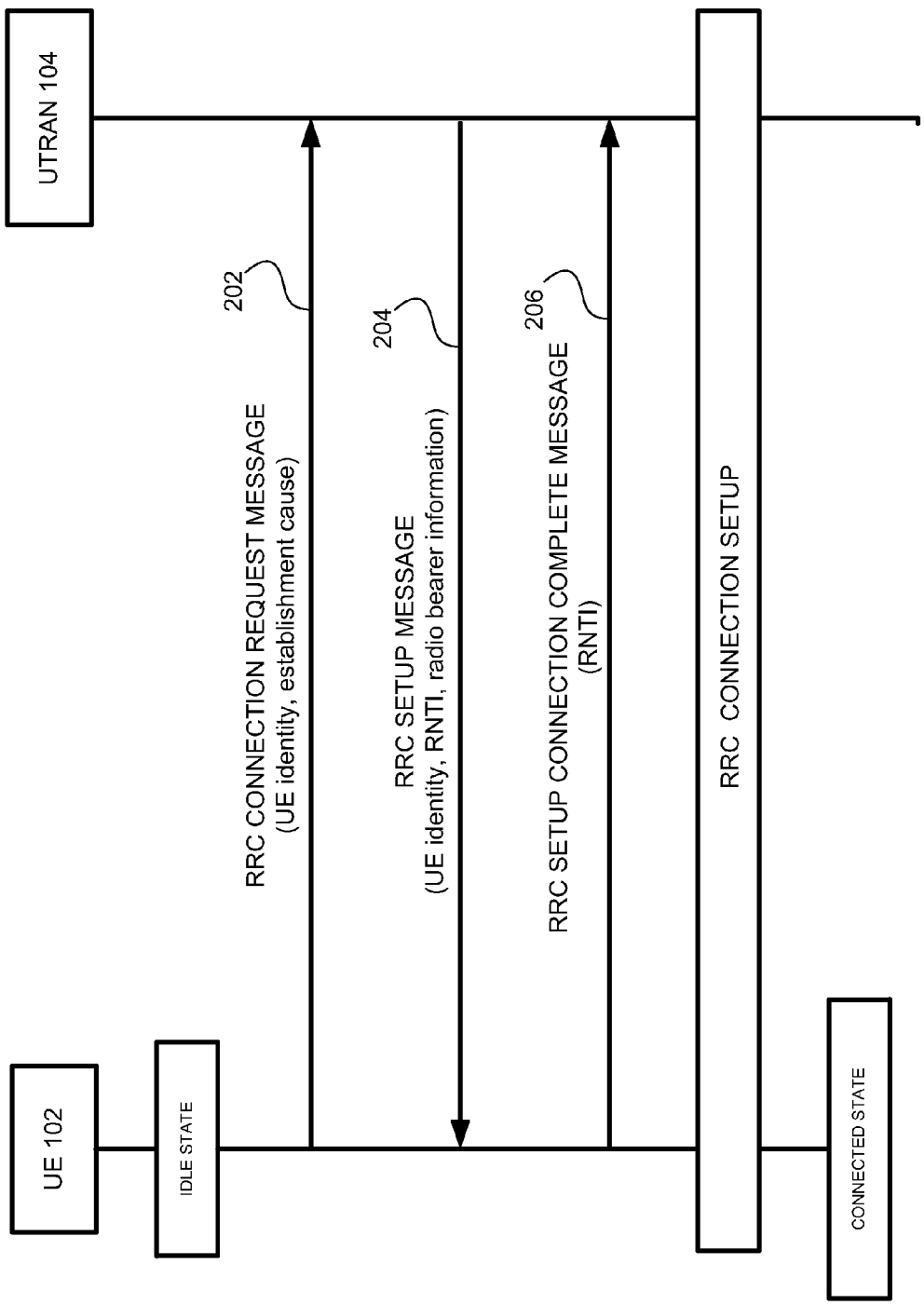
FIG. 2 illustrates the procedure when the UTRAN accepts the RRC connection request of a UE.

FIG. 2 illustrates the procedure when the UTRAN 104 accepts the RRC connection request from UE 102. When in an idle state, UE 102 wishes to establish an RRC connection, UE 102 first transmits RRC connection request message 202 to the UTRAN 104. RRC connection request message 202 can include an RRC establishment cause and an initial UE identifier. The initial UE identifier, or UE identity, is an identifier that is unique to a particular UE and allows that UE to be identified despite its location anywhere in the world. In response to RRC connection request 202, UTRAN 104 can transmits RRC connection setup message 204 to UE 102. RRC connection setup message 204 can include an RNTI (Radio Network Temporary Identity) and radio bearer setup information transmitted together with an initial UE identity. The RNTI is a UE identifier allocated to allow UTRAN 104 to identify connected state UEs. The RNTI is used only when an RRC connection exists and is used only within UTRAN 104. In response to RRC connection setup message, UE 102 establishes an RRC connection with UTRAN 104 and transmits RRC connection setup complete message 206 to the UTRAN 104. After the RRC connection has been established, UE 102 uses the RNTI instead of the initial UE identity when communicating with the UTRAN 104. The RRC state refers to whether there is a logical connection between the RRC of UE 102 and the RRC of the UTRAN 104. If there is a connection, UE 102 is said to be in RRC connected state. If there is no connection, UE 102 is said to be in idle state.

Figure 3:
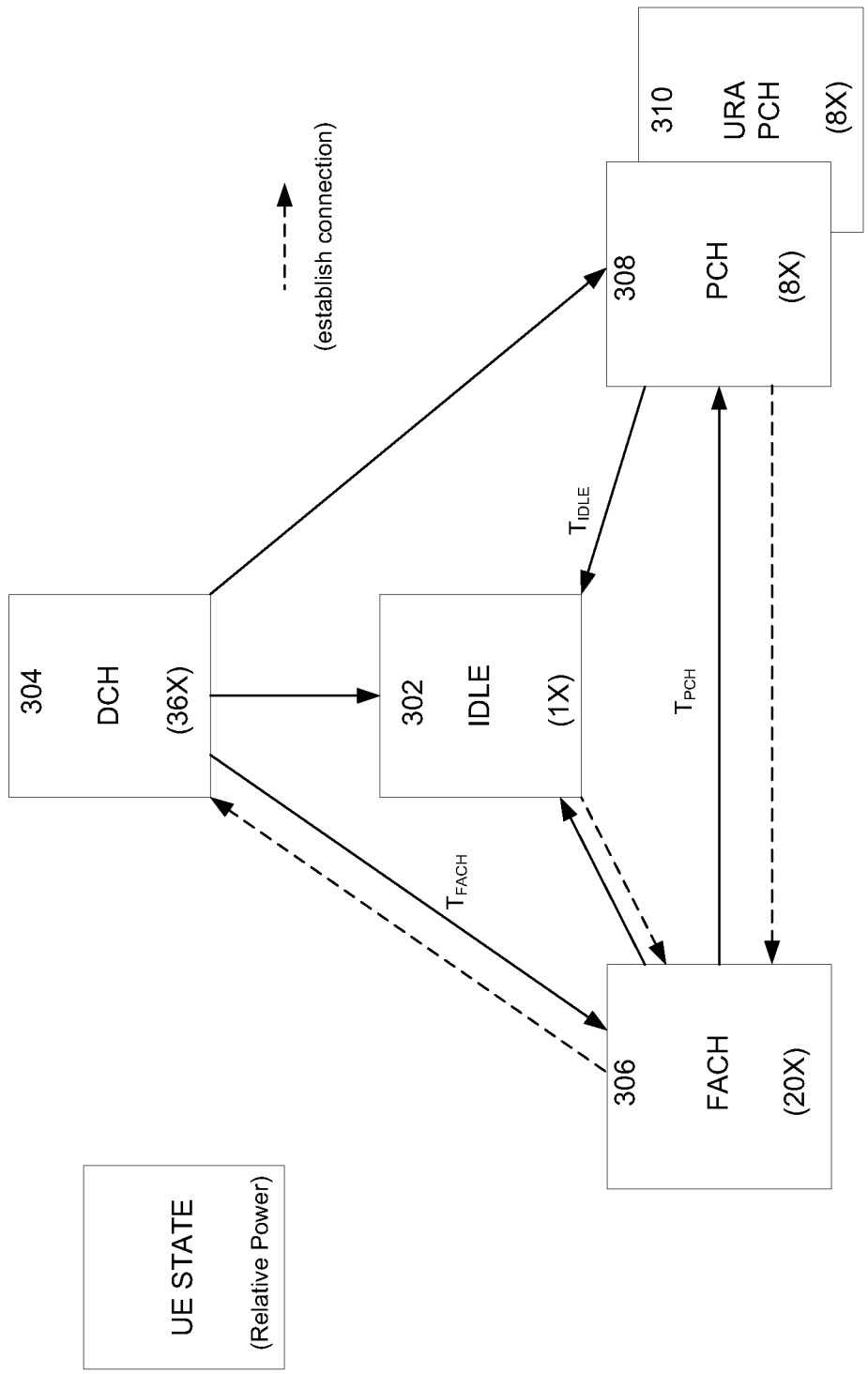
FIG. 3 is a block diagram showing the various modes and states for the radio resource control portion of a protocol stack in a UMTS network.

FIG. 3 is a block diagram showing the various modes and states for the radio resource control portion of a protocol stack in a UMTS network. As discussed above, the RRC can be either in an RRC unconnected mode (IDLE) or an RRC connected mode. In idle mode 302, UE 102 must request an RRC connection to set up the radio resource whenever data needs to be exchanged between UE 102 and the UTRAN 104. This can be as a result of either an application on UE 102 requiring a connection to send data, or as a result of UE 102 monitoring a paging channel to indicate whether UTRAN 104 or SGSN 118 has paged UE 102 to receive data from an external data network such as a push server. Once UE 102 has sent a request to UTRAN 104 to establish a radio connection, UTRAN 104 chooses a state for the RRC connection to be in.

Specifically, the RRC connected mode includes four separate states, CELL_DCH state 304, CELL_FACH state 306, CELL_PCH state 308 and URA_PCH state 310. For example, from idle mode 302 UE 102 can transition to the CELL_FACH state 306, in which it makes its initial data transfer, subsequent to which the network determines which RRC connected state to use for continued data transfer. This may include the network either moving UE 102 into the Cell Dedicated Channel (CELL_DCH) state 304 or keeping UE 102 in the Cell Forward Access Channel (CELL_FACH) state 306. In CELL_DCH state 304, a dedicated channel is allocated to UE 102 for both uplink and downlink to exchange data. This state, since it has a dedicated physical channel allocated to UE 102, typically requires the most battery power from UE 102 as noted by the relative power of 36× by which it is meant that on the average, UE 102 requires 36 times as much power to maintain CELL_DCH state 304 as that required for IDLE state 302 (at 1×). Alternatively, UTRAN 104 can maintain UE 102 in a CELL_FACH state 306. In a CELL_FACH state 306 no dedicated channel is allocated to UE 102. Instead, common channels are used to send signaling in a small amount of bursty data. However, UE 102 still has to continuously monitor the FACH, and therefore it consumes more battery power (having a relative power consumption of 20×) than in CELL_PCH state 308 and URA_PCH state 410 (each with a relative power consumption of 8×) and in IDLE state 302.

Within the RRC connected mode, the RRC state can be changed at the discretion of UTRAN 104. Specifically, if data inactivity is detected for an amount of time specific for each state transition $T_{state}$ (or data throughput below a certain threshold is detected) UTRAN 104 may move the RRC state from one state to another. For example, if data inactivity is detected for an amount of time $T_{FACH}$ then UTRAN 104 can move the RRC state from CELL_DCH state 304 to the CELL_FACH state 306. From CELL_FACH state 306, if data inactivity is detected for a predetermined time $T_{PCH}$, the UTRAN can move the RRC state from CELL_FACH state 306 to a CELL_PCH 308 or URA_PCH state 410. From CELL_PCH state 308 or URA_PCH state 310, UE 102 must move to CELL_FACH state 306 in order to initiate a CELL (or URA) Update procedure to request a dedicated channel. This is the only state transition that UE 102 controls. The difference between CELL_PCH state 308 and URA_PCH state 310 is that the URA_PCH state 308 only triggers a URA update procedure if a UE's current UTRAN registration area (URA) is not among the list of URA identities present in the current cell.

Figure 4:
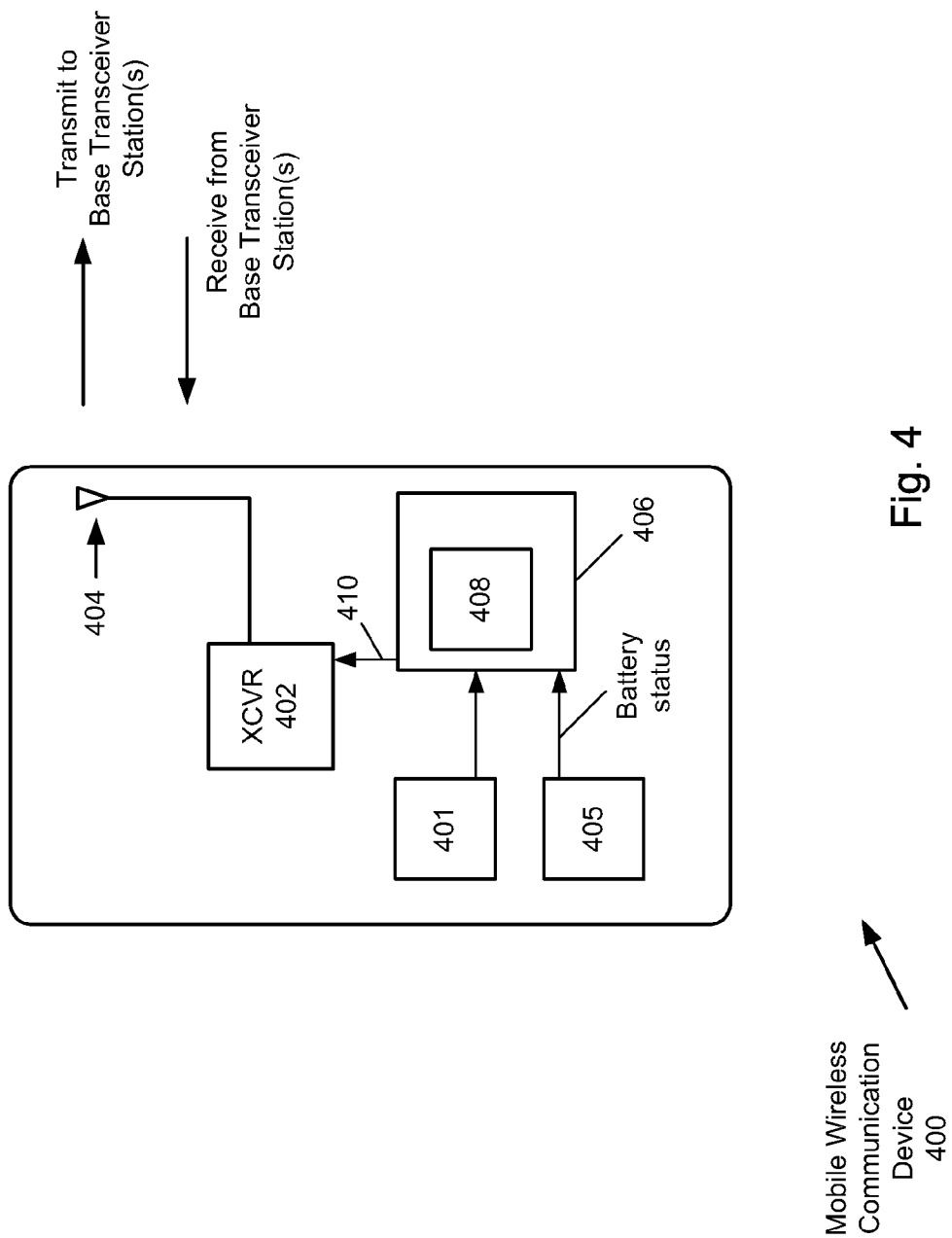
FIG. 4 shows a representative mobile wireless communication device in accordance with the described embodiments.
Figure 5:
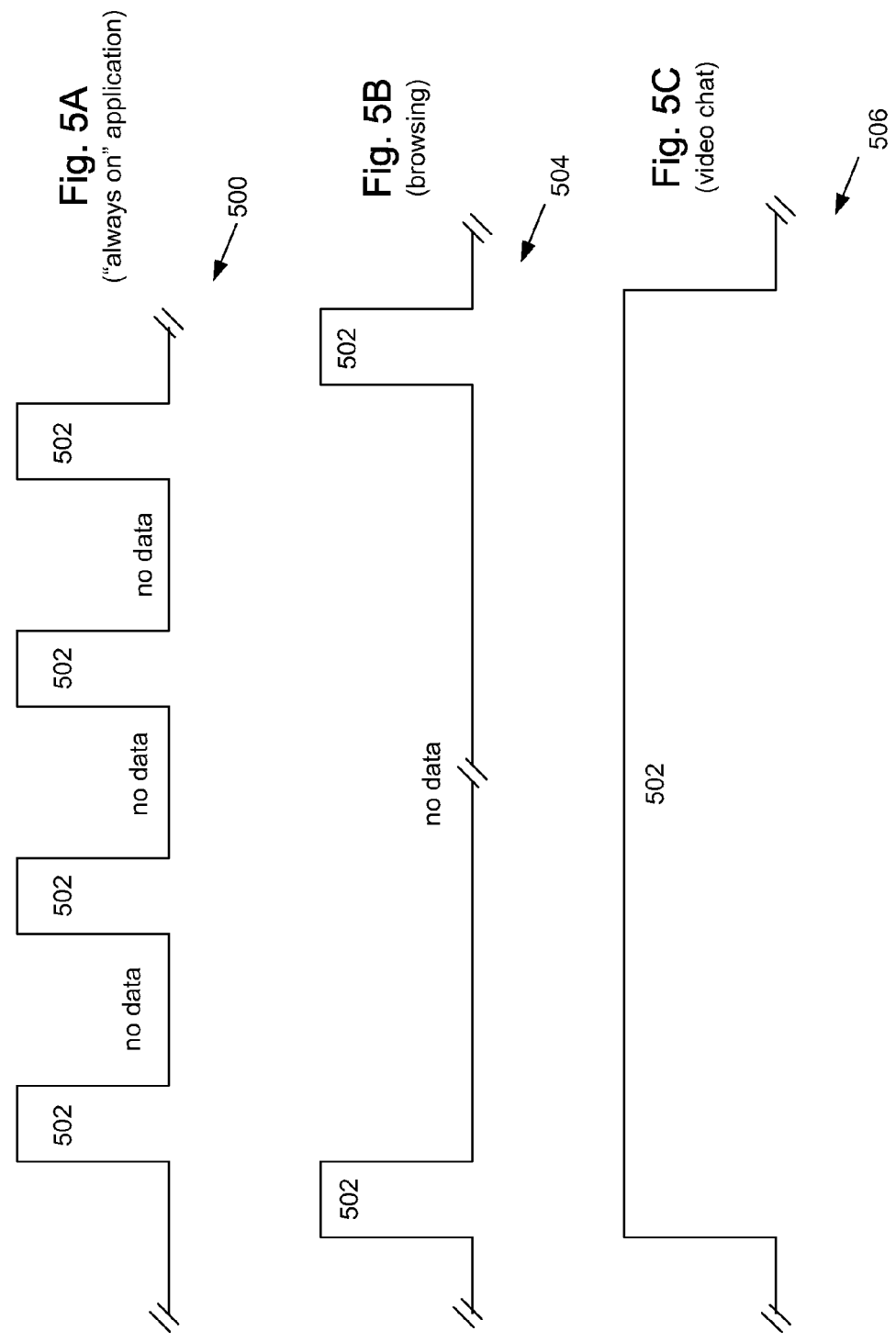
FIGS. 5A-5C show representative data traffic patterns in accordance with the described embodiments.

FIG. 4 illustrates a representative embodiment of UE 102 in the form of mobile wireless communication device 400 (referred to hereinafter as simply communication device 400) that can include at least processor 401 and transceiver (XCVR) 402 that can transmit and receive radio frequency signals to and from base transceiver stations in wireless communication network UTRAN 104 through antenna 404. In some embodiments, multiple antennas can be included in communication device 400 to increase transmit and/or receive signal diversity. Transceiver 402 can encode and modulate digital data into analog signals for transmission on a radio frequency carrier through antenna 404. Similarly transceiver 402 can demodulate and decode analog signals received by antenna 404. Battery 405 can provide power to operate communication device 400 when not receiving power from an external power supply. Battery 405 is also arranged to provide information such as battery charge status to processor 401 or controller 406 can formulate digital data messages that can be transmitted and received by transceiver 402. Controller 406, for example, can monitor signals received from multiple base transceiver stations in UTRAN 104 and can generate control messages to be sent over the uplink direction of the radio frequency link between communication device 400 and UTRAN 104. In the described embodiment, the control signals can include information generated by connection state machine 408 and provided to UTRAN 104 using an uplink channel that UTRAN 104 can use to control an RRC connection state of communication device 400. The control of the RRC connection state of communication device 400 can be used to modify the power consumption of communication device 400.

As discussed above, since there is strong coupling between the RRC connection state and the amount of power consumed (and resulting battery life) by communication device 400, the power consumption (and therefore the expected battery life) of communication device 400 can be optimized by more closely aligning a current RRC connection state to a current operating state of communication device 400. More specifically, information concerning the current operating state of communication device 400 can include an indication of data uploads and downloads (referred to as a data traffic pattern) received from and sent to UTRAN 104 at communication device 400. This data traffic pattern can influence the RRC connection state of communication device 400 and thereby can affect an amount of power currently being consumed by communication device 400. For example, CELL_DCH connection state is the only RRC connection state that allocates a dedicated data channel used for substantial data transfer between UTRAN 104 and communication device 400. However, as seen in FIG. 3, the allocation of the dedicated data channel requires a substantial commitment of resources of battery 4xx to provide the power necessary to sustain and service the dedicated communication channel (CELL_DCH requires approximately 36 times more power than that required in IDLE mode). Therefore, it would be desirable from a power consumption standpoint for communication device 400 to remain in CELL_DCH for only as long as necessary to complete a particular data transaction (both a data upload and download). For example, in order to keep power consumption to a minimum, communication device 400 can be instructed to remain in CELL_DCH for only so long as data is being actively transferred and to transition to a lower power consuming RRC connection state such as CELL_PCH or even to the lowest power consuming state (although in an unconnected state), i.e. IDLE when it is determined that the data transaction is ended.

Although desirable from a power consumption standpoint, re-establishing a data channel from the IDLE state requires a substantial commitment of network resources due to the signaling traffic between UTRAN 104 and communication device 400. Therefore, in order to establish an optimal working relationship between communication device 400 and UTRAN 104, connection state machine 408 can formulate a network request 410 that can be included as part of a control message (such as SCRI and any connection status response described in more detail below) forwarded to UTRAN 104 by way of transceiver 402. Network request 410 can take into account the current operating state of communication device 400 that can include a determination of a current battery state, a determination if communication device 400 is using only battery power, and current or anticipated data traffic pattern. The current (or anticipated) data traffic pattern can have a substantial impact on the current (or anticipated) power consumption of communication device 400 as described below.

The mode in which communication device 400 is being operated (i.e., browsing mode, video chat mode, and so on)

can dictate the data traffic pattern required to adequately service that mode. For example, FIGS. 5A-5C show various data traffic patterns representing particular modes of the operation of communication device 400. In particular, FIG. 5A shows a representation of data traffic pattern 500 consistent with communication device 400 executing an application that can cause communication device 400 to operate in what is referred to as an always on mode. In the always on mode, short duration data 502 can be periodically transferred between communication device 400 and UTRAN 104. Data 502 can, for example, originate at communication device 400 as current location data provided to a server computer by way of UTRAN 104. Data 502 can also originate from a server computer (such as an email server as shown in FIG. 5B as data pattern 504) that can periodically push data (email updates, for example) to communication device 400. In any case, in order to adequately service the transfer of data 502, there must be a dedicated data channel between communication device 400 and UTRAN 104. In other words, UTRAN 104 can instruct communication device 400 to transition to RRC connection status of CELL_DCH at least for an amount of time $T_1$ required for the transfer of data 502 between communication device 400 and UTRAN 104. However, in order to optimize power consumption, communication device 400 can transition from CELL_DCH a low power consumption state (such as IDLE or CELL_PCH) mode for a period of time $T_2$ subsequent to the completion of the transfer of data 502. After the period of time $T_2$ has expired, communication device 400 can transition back to CELL_DCH state in order to properly service the next transfer of data 502 during the next time period $T_1$. It should be noted, however, that substantial network resources can be required to repeatedly re-establish the dedicated data channel characteristic of CELL_DCH that can result in network congestion and/or reduced call quality (i.e., increased drop rate, slower response time, transfer rates, and so on). FIG. 5C shows data traffic pattern 506 representative of large amounts of data being transferred between UTRAN 104 and communication device 400. Data traffic pattern 506 can be representative of, for example, video chatting. In this case, communication device 400 can provide request 410 that maintains communication device 400 in CELL_DCH for so long as data is being transferred between communication device 400 and the external video chat server by way of UTRAN 104.

Figure 6:
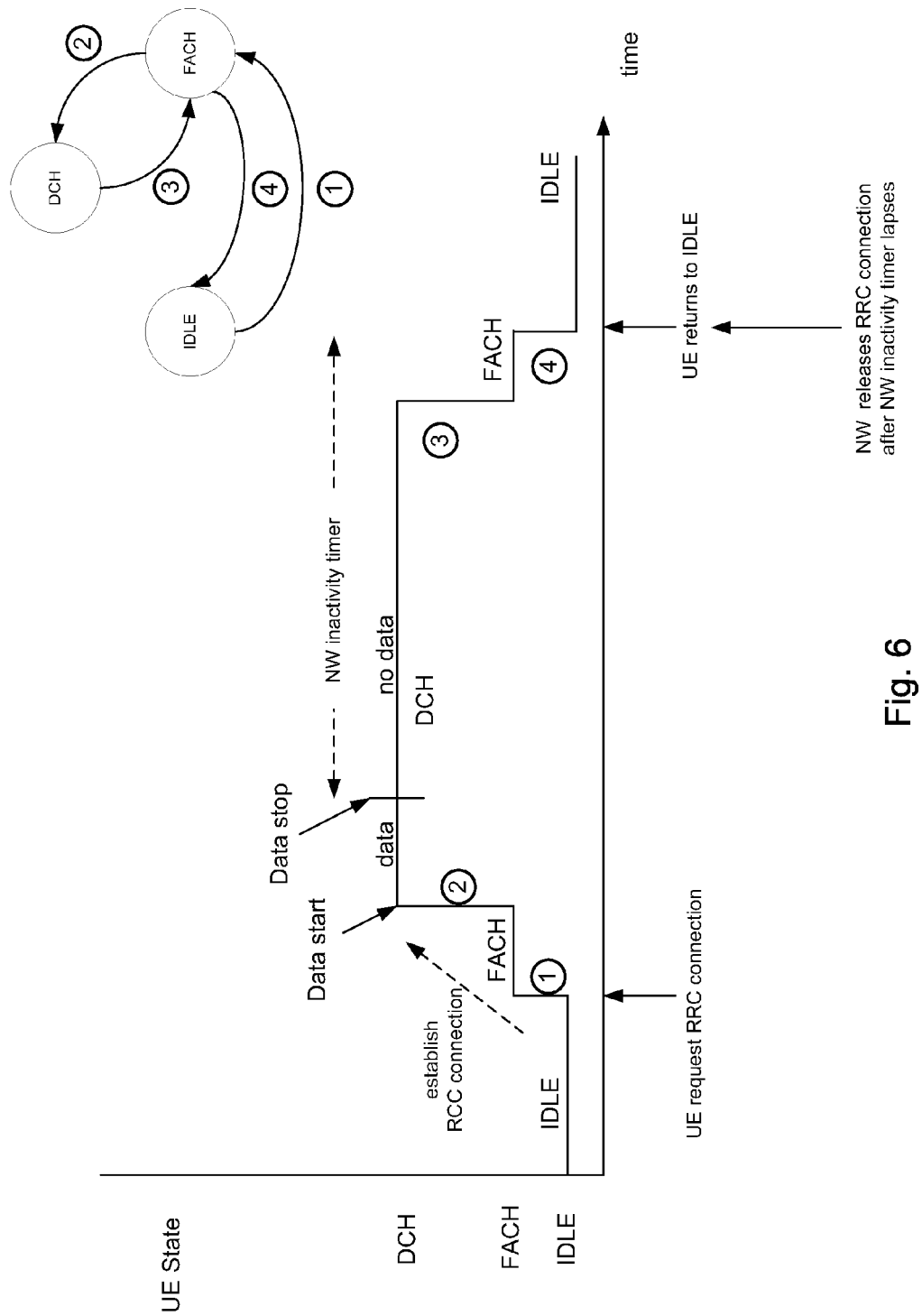
FIGS. 6-11 show UE power graphs and associated UE state diagrams in accordance with the described embodiments.

Some networks may not honor request 410 provided by communication device 400 and will nonetheless resort to using the network default communication device connection protocol instead of that requested by communication device 400. FIG. 6 illustrates one such case where the network does not honor request 410 and responds using a network protocol. In particular, FIG. 6 shows UE relative power consumption diagram 600 and related UE state transition diagram 602 for a network that does not honor request 410 or UE 102 either does not have the capability of requesting changes to network default timers or other network parameters. In any case, in order to send or receive data 502, UE 102 must establish an RRC communication channel by submitting an RRC connection request to UTRAN 104 along the lines described above and shown in FIG. 2. More specifically, UE 102 initiates the establishment of an RRC connection by sending an RRC connection request (RRC) message. This message contains an "Initial UE Identity" which could be for example IMSI, TMSI or P-TMSI. An RRC connection setup (RRC) message is sent by the network to accept the establishment of an RRC connection for a UE and to assign a C-RNTI to the UE that required the RRC connection setup. UE 102 is addressed with the "Initial UE identity" that was received in the RRC connection request message. If the establishment request was rejected the network transmits an RRC connection reject. Finally, an RRC connection setup complete message (RRC) is sent from UE 102 if an "RRC connection setup" was received from UTRAN 104.

During the establishment of the RRC connection, UTRAN 104 can move UE 102 from IDLE state to CELL_DCH state at which data can be transported via an uplink or downlink channel. Once the transfer of data is complete, UTRAN 104 maintains UE 102 in CELL_DCH state until a default network inactivity timer (NIT) elapses. It should be noted that the NIT is specific to each network. In any case, once the NIT elapses, UTRAN 104 closes the RRC communication channel and moves UE 102 to the IDLE state. As previously noted, there can be a substantial misallocation of resources due to the fact that UTRAN 104 must wait at least until the expiration of the NIT before relinquishing the RRC communication channel causing UE 102 to expend substantial power resources. Furthermore, since UTRAN 104 cannot comprehend the current or anticipated operating state of UE 102, causing UE 102 to transition to IDLE can require the expenditure of substantial network signaling resources due to the possibility of re-establishing the RRC connection in a relatively short time. For example, if UE 102 is executing the "always on" application that periodically sends data to an external server, within a relatively short time the RRC connection must be established adding substantially to the network messaging burden. This increase in network messaging burden can have the effect of reducing the Quality of Service (QoS) of UTRAN 104 that can result in a spike in dropped calls, slow data transmission, and so on.

Figure 7:
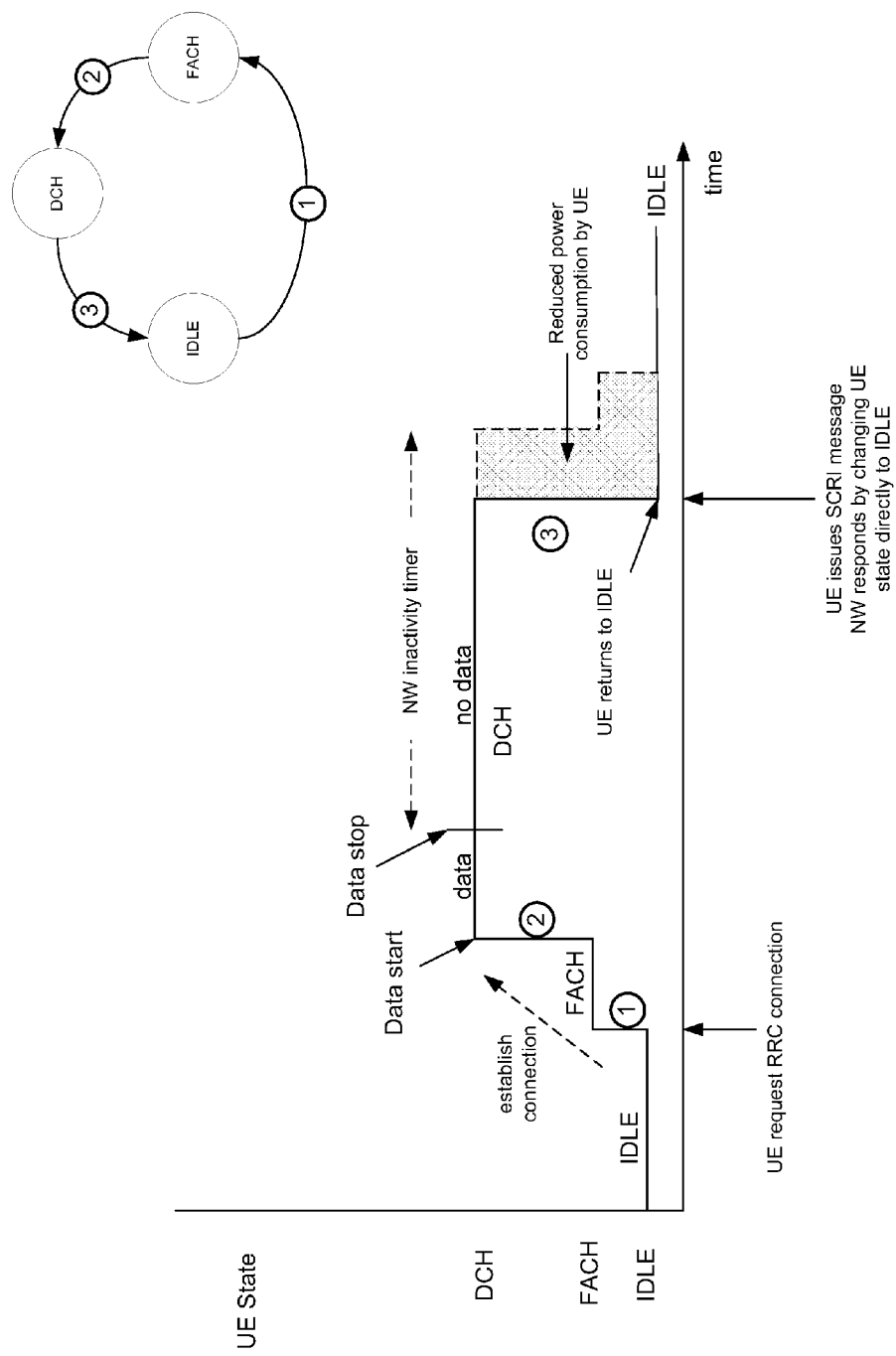

FIG. 7 shows a scenario whereby UE 102 can influence UTRAN 104 to some extent by generating SCRI signal (referred to as a SCRI in UMTS term, the "Signal Connection Release Indication" with the cause value) at some point in time after the completion of the transfer of data 502. In order to preserve battery power, UE 102 can issue signaling release indication SCRI having an non-essential information element, or IE, modified along the lines of Eq. (1):

$$SCRI = \{\text{non essential information element (IE)}\}, \quad \text{Eq (1)}$$

where FD_STATE is defined as {fd_DCH, fd_FACH; fd_IDLE}.

In this way, the modified SCRI message can provide an indication to UTRAN 104 that UE 102 has determined that it has concluded active PS data transfer. UTRAN 104 upon reception of this IE can trigger an RRC state transition in UE 102 to a more battery efficient state (such as CELL_FACH or IDLE). It should be noted that the states IDLE, URA_PCH and CELL_PCH are all considered battery efficient states.

Figure 8A:
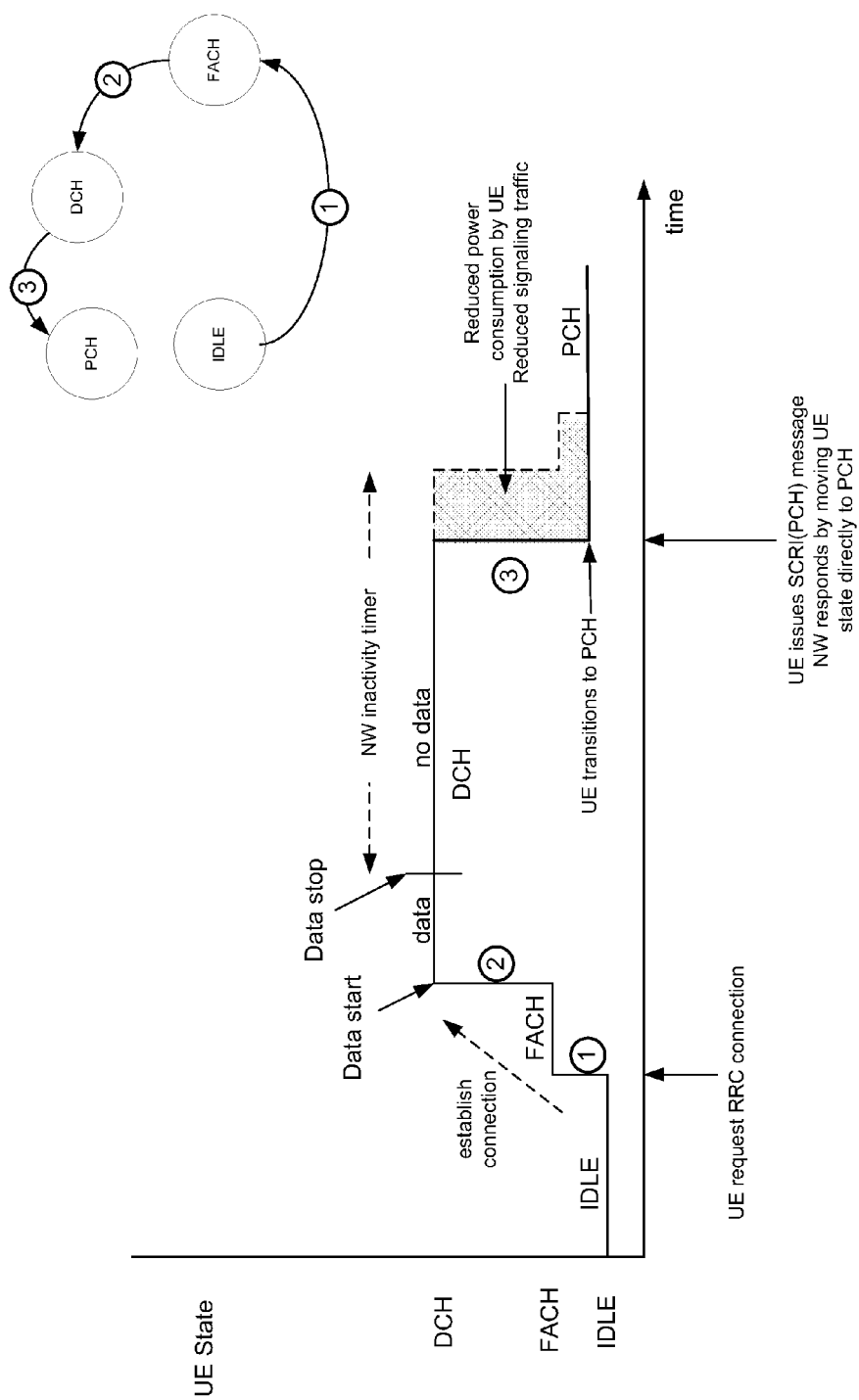
Figure 8B:
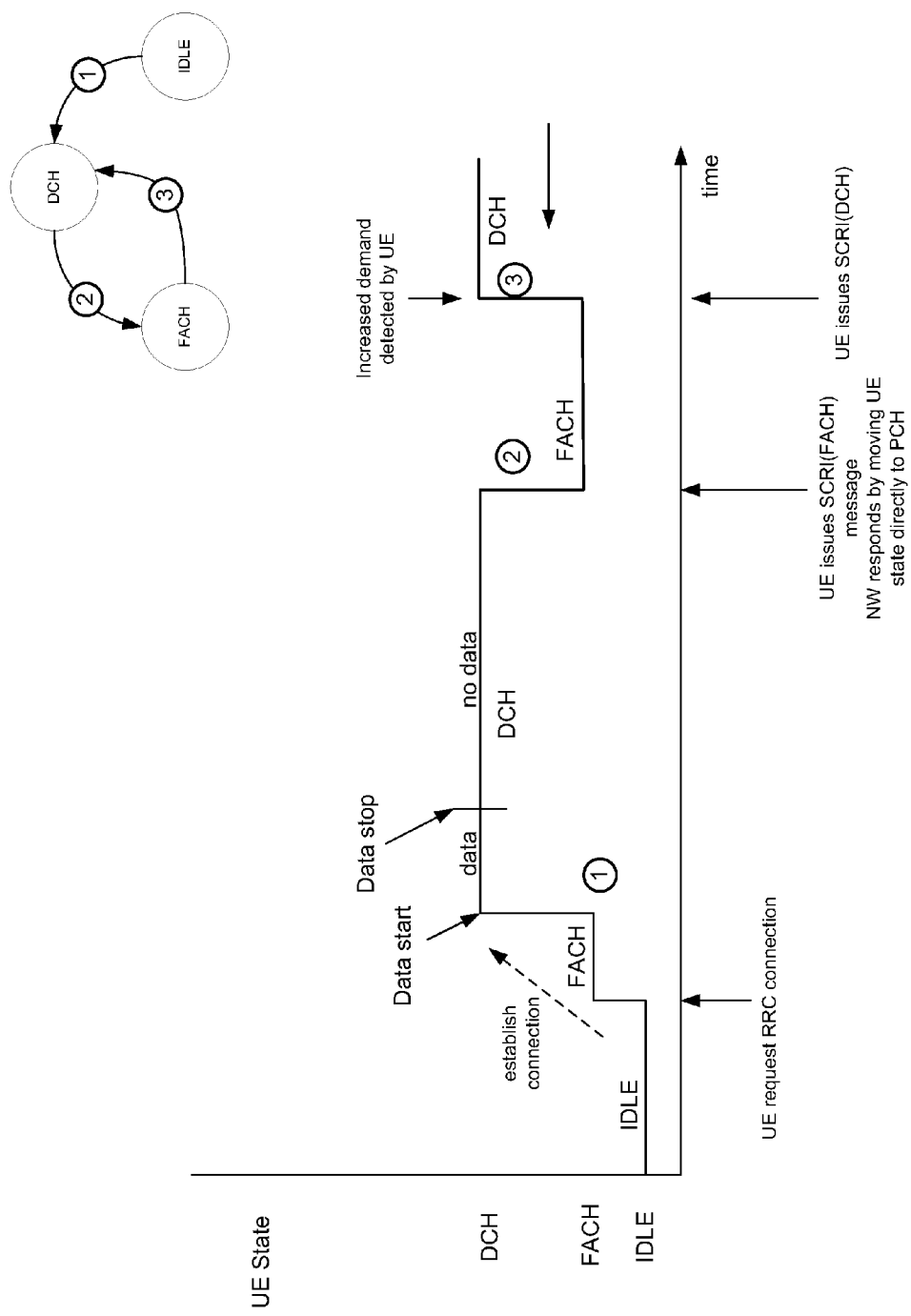

FIG. 8A shows a scenario where UE 102 can use the SCRI message with cause to signal a request to UTRAN 104 to change the connection state of UE 102 from CELL_DCH to CELL_PCH instead of IDLE. In this way, the signaling burden on UTRAN 104 is reduced over that when UE 102 is transitioned to IDLE especially as described above where the RRC connection is re-established on a frequent basis as is the case with always on or data push situations. For example, if UE 102 is executing an "always on" applications that require data to be pushed to or pulled from a server computer, then the additional signals required to frequently tear down and re-establish the data channel in when UE 102 transitions from IDLE to DCH and back again can be substantial. This increase in network message traffic can create bottlenecks resulting in degradation of network QoS (dropped calls, poor data transport, etc.). FIG. 8B shows the situation where UE 102 has determined an increase in data traffic is or will occur and has responded by issuing a SCRI message that causes UTRAN 104 to change the RRC connection state of UE 102 from CELL_FACH back to CELL_DCH.

In order to optimize the power consumption of UE 102, UE 102 can provide UTRAN 104 with requested inactivity timers that can be used by UTRAN 104 to change the mode of UE 102 to operate in a more power efficient manner and still maintain good network QoS. For example, UE 102 can use modified network messages to notify UTRAN 104 of requested timeout_per_state values corresponding to an efficient power usage state. The requested timeout_per_state values can be used to more closely align the actual and anticipated operating state of UE 102 with the connection state that UTRAN 104 sets. For example, if UE 102 is operating (or anticipates operating) in an operating mode that requires frequent data uploads and downloads (such as a browsing mode), then it would be more power efficient for UTRAN 104 to be able to more closely align any UE connection state transitions to actual data transfer behavior by, for example, requesting a shorter data inactivity interval for UE 102 to transition from CELL_DCH to CELL_PCH and not IDLE since it is anticipated that a new RRC connection will be established in a relatively short time. By going to CELL_PCH, and not IDLE, the amount of power saved is somewhat reduced, however, the connection signal traffic between UE 102 and UTRAN 104 to repeatedly establish a data channel is substantially reduced preserving network performance.

Figure 9:
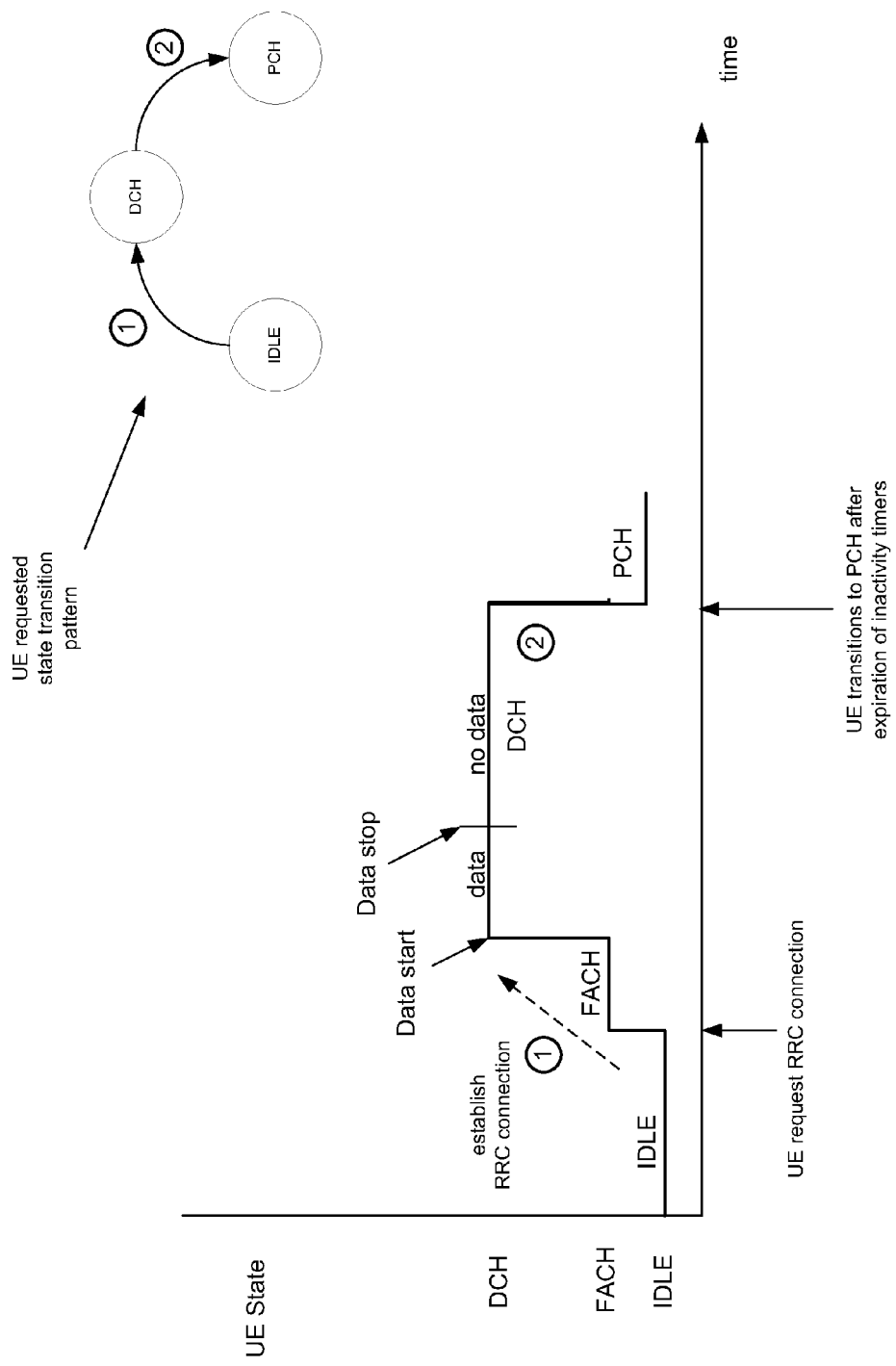
Figure 10:
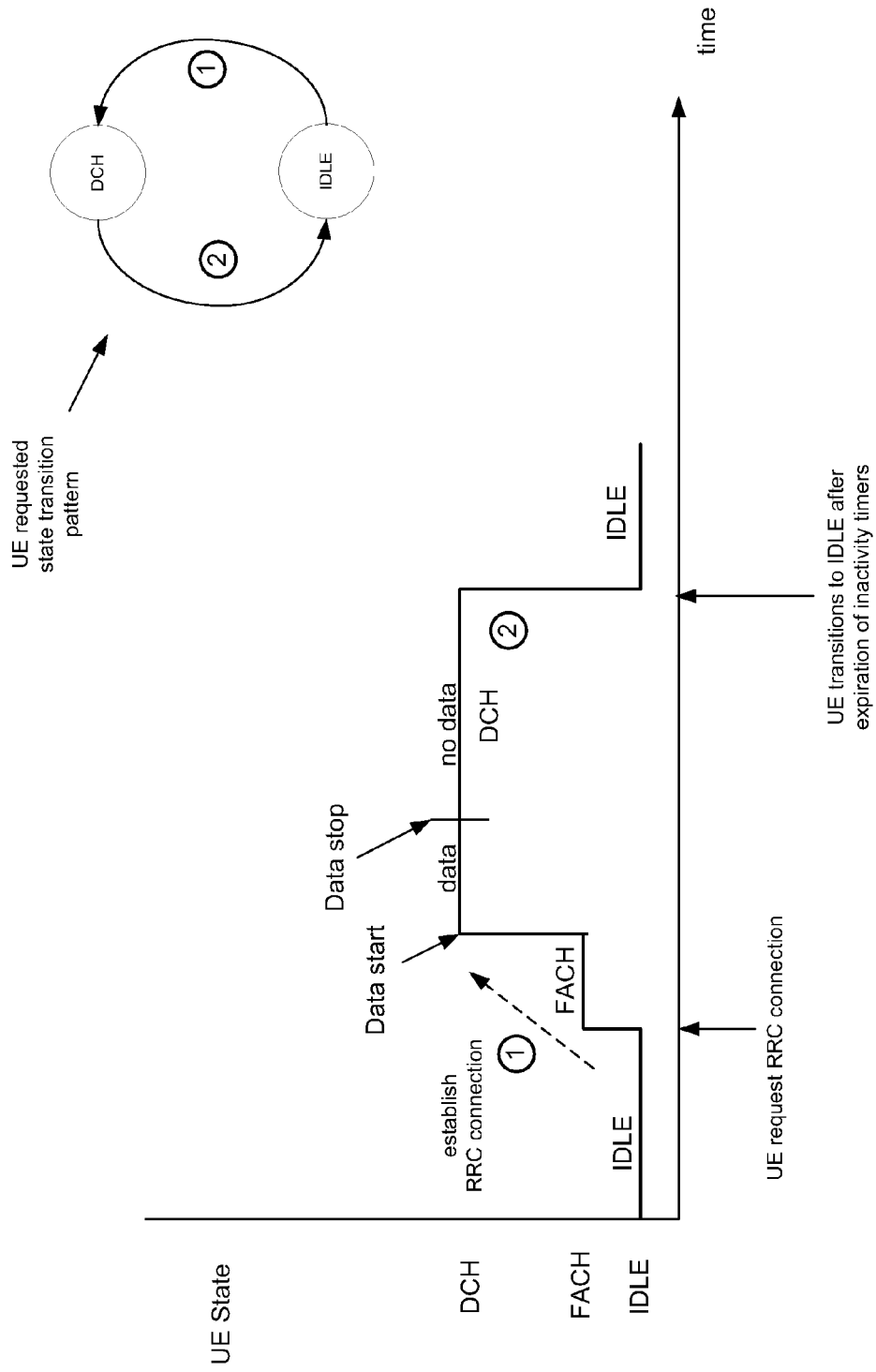
Figure 11:
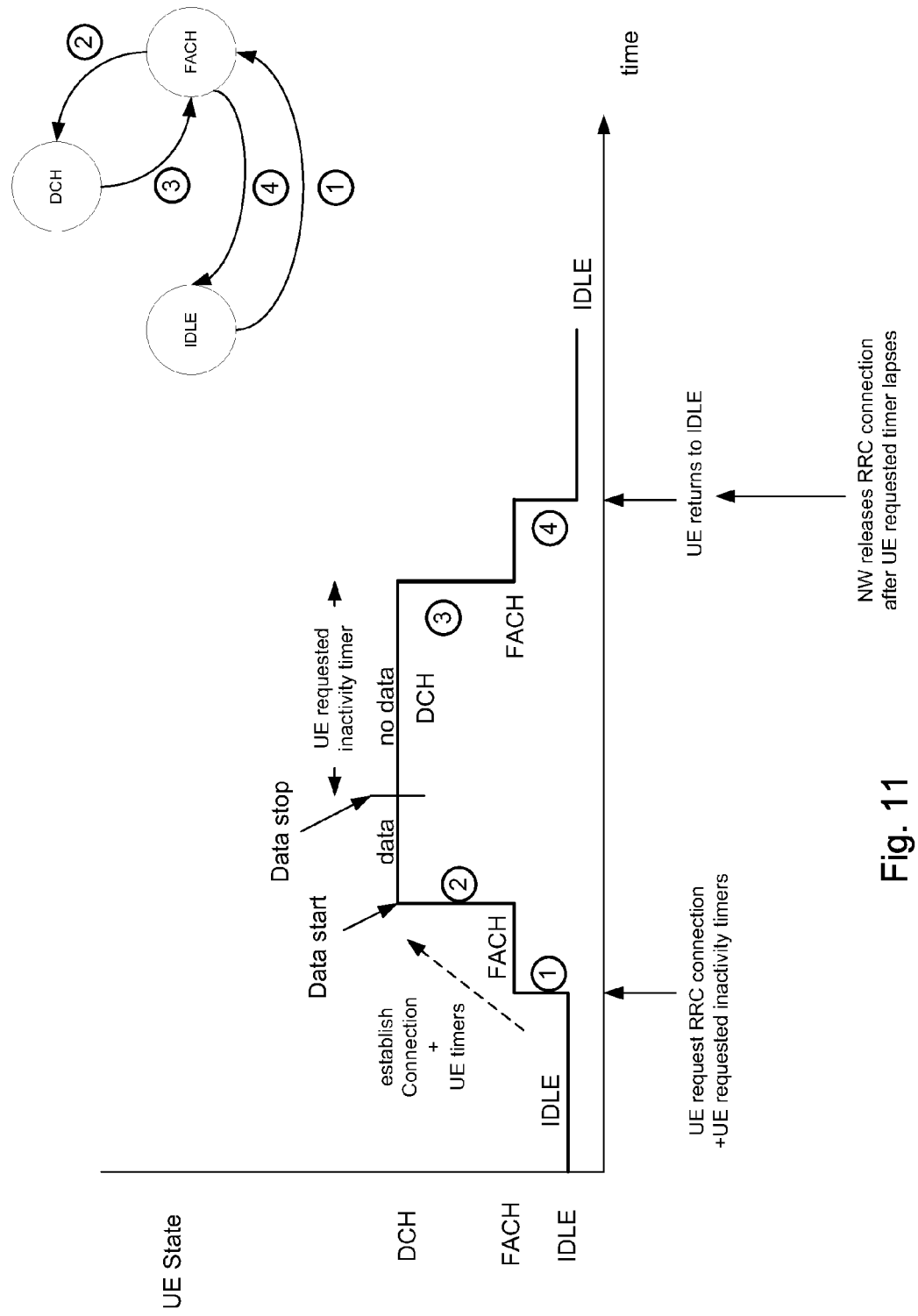

For example, FIGS. 9-11 show various embodiments whereby UE 102 provides requested timeout per state values to UTRAN 104 depending upon the current or anticipated operating state of UE 102. For example, when UE 102 is operating (or anticipates to operate) in a data browsing mode, then UE 102 can submit timeout per state values consistent with the state transition pattern shown in FIG. 9 where UE 102 has submitted requested timeout_per_ state values that cause UTRAN 104 to direct UE 102 to change from CELL_DCH directly to CELL_PCH whereas FIGS. 10 and 11 shows UTRAN 104 directing UE 102 to transition from CELL_DCH to IDLE (directly in the case of FIG. 10) that is more appropriate for those situations where battery power is critical and there repeated requests to establish an RRC connection is not anticipated.

It should be noted that the timeout_per_state values are forwarded from UE 102 to UTRAN 104 when an RRC connection is requested. There are different ways to change Radio Connection (under different conditions, different radio link or new cell). Smart device can use the response message to send the state_timers to UTRAN, while the radio link is modified. For example, the following response messages can be used to provide the "state_timers" to UTRAN 104:
  (i) RadioBearerSetupComplete (Different Radio or New cell)
  (ii) RadioBearerReleaseComplete
  (iii) RadioBearerReconfigurationComplete
  (iv) TransportChannelReconfigurationComplete
  (v) PhysicalChannelReconfigurationComplete
  (vi) RRCConnectionSetupComplete (see FIG. 2)
  (vii) HandoverToUTRANComplete (New RAT in UMTS)
  (viii) RRCConnectionReestablishmentComplete
  (ix) RRCConnectionReconfigureationComplete
  (x) CellChangedOrderFromUTranFailure
  (xi) UTRANMobilityInformationConfirm (in response to UTRANMobilityInformation, CellUpdate, and URAUpdate messages)

Figure 12:
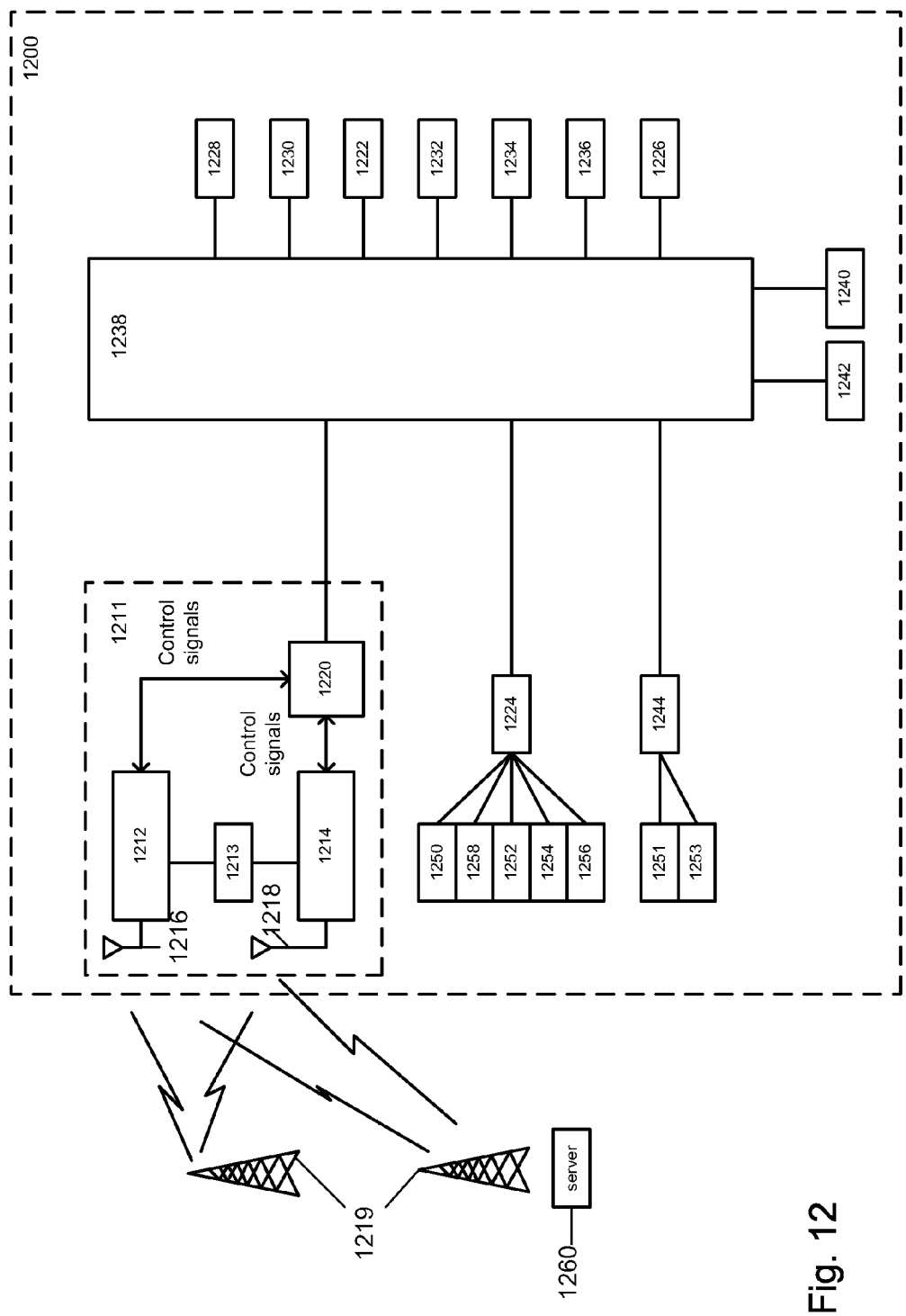
FIG. 12 shows a representative UE in accordance with the described embodiments.

While the above can be implemented on a variety of mobile or wireless devices, an example of one mobile device is outlined below with respect to FIG. 12. UE 1200 is preferably a two-way wireless communication device having at least voice and data communication capabilities. UE 1200 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples. Where UE 1200 is enabled for two-way communication, it will incorporate a communication subsystem 1211, including a receiver 1212 and a transmitter 1214, as well as associated components such as one or more, preferably embedded or internal, antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate. For example, UE 1200 may include a communication subsystem 1211 designed to operate within the GPRS network or UMTS network.

Network access requirements will also vary depending upon the type of network. For example, In UMTS and GPRS networks, network access is associated with a subscriber or user of UE 1200. For example, a GPRS mobile device therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling may be available, but mobile device 1200 will be unable to carry out any other functions involving communications over the network 1200. The UIM interface 1244 is normally similar to a card-slot into which a card can be inserted and ejected like a diskette or PCMCIA card. The UIM card can hold many key configuration 1251, and other information 1253 such as identification, and subscriber related information.

When required network registration or activation procedures have been completed, UE 1200 may send and receive communication signals over the network 1219. Signals received by antenna 1216 through communication network 1219 are input to receiver 1212, which may perform such common receiver functions as signal amplification, frequency down conversion, filtering, channel selection and the like, and in the example system shown in FIG. 12, analog to digital (A/D) conversion. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220. Network 1219 may further communicate with multiple systems, including a server 1260 and other elements (not shown). For example, network 1219 may communicate with both an enterprise system and a web client system in order to accommodate various clients with various service levels.

UE 1200 preferably includes a microprocessor 1238, which controls the overall operation of the device. Communication functions, including at least data communications, are performed through communication subsystem 1211. Microprocessor 1238 also interacts with further device subsystems such as the display 1222, flash memory 1224, random access memory (RAM) 1226, auxiliary input/output (I/O) subsystems 1228, serial port 1230, keyboard 1232, speaker 1234, microphone 1236, a short-range communications subsystem 1240 and any other device subsystems generally designated as 1242. Some of the subsystems shown in FIG. 7 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the microprocessor 1238 is preferably stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226. Further, a unique identifier is also preferably stored in read-only memory. As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Microprocessor 1238, in addition to its operating system functions, preferably enables execution of software applications on the mobile device.

A predetermined set of applications that control basic operations, including at least data and voice communication applications for example, will normally be installed on UE 1200 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1219. In a preferred embodiment, the PIM data items are seamlessly integrated, synchronized and updated, via the wireless network 1219, with the mobile device user's corresponding data items stored or associated with a host computer system. Further applications may also be loaded onto the mobile device 1200 through the network 1219, an auxiliary I/O subsystem 1228, serial port 1230, short-range communications subsystem 1240 or any other suitable subsystem 1242, and installed by a user in the RAM 1226 or preferably a non-volatile store (not shown) for execution by the microprocessor 1238. Such flexibility in application installation increases the functionality of the device and may provide enhanced on-device functions, communication-related functions, or both. For example, secure communication applications may enable electronic commerce functions and other such financial transactions to be performed using the UE 1200. These applications will however, according to the above, in many cases need to be approved by a carrier.

In a data communication mode, a received signal such as a text message or web page download will be processed by the communication subsystem 1211 and input to the microprocessor 1238, which preferably further processes the received signal for output to the display 1222, or alternatively to an auxiliary I/O device 1228. A user of UE 1200 may also compose data items such as email messages for example, using the keyboard 1232, which is preferably a complete alphanumeric keyboard or telephone-type keypad, in conjunction with the display 1222 and possibly an auxiliary I/O device 1228. Such composed items may then be transmitted over a communication network through the communication subsystem 1211.

For voice communications, overall operation of UE 1200 is similar, except that received signals would preferably be output to a speaker 1234 and signals for transmission would be generated by a microphone 1236. Alternative voice or audio I/O subsystems, such as a voice message recording subsystem, may also be implemented on UE 1200. Although voice or audio signal output is preferably accomplished primarily through the speaker 1234, display 1222 may also be used to provide an indication of the identity of a calling party, the duration of a voice call, or other voice call related information for example.

Figure 13:
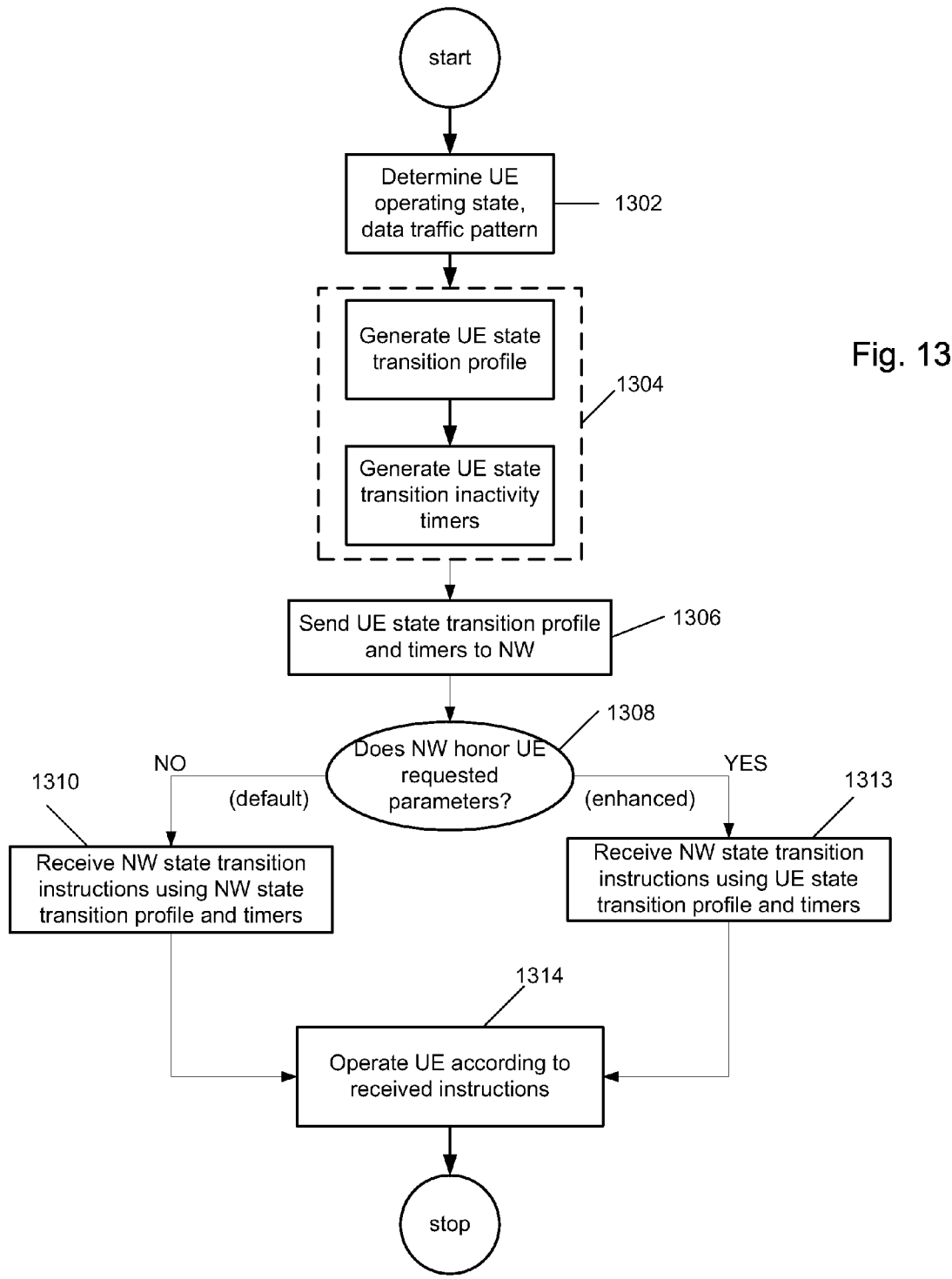
FIG. 13 shows a flowchart detailing a process in accordance with the described embodiments.

FIG. 13 shows a flowchart detailing process 1320 in accordance with the described embodiments. Process 1300 can be performed by the UE. Process 1300 can be carried out by determining the operating state and data traffic pattern for the UE at 1302 and at 1304, the UE generates a UE state transition profile and associated UE state transition inactivity timers. At 1306, the UE state transition timers associated with the UE state transition profile are forwarded to a network NW. The UE can check the status of other configured transport channels associated with all other higher layer applications that are configured and make an intelligent composite decision as when to indicate that there is no more PS data for a prolonged duration. In the described embodiment, the requested timers can be included in a response message used to create a RRC channel, for example. If at 1308 it is determined that the network does not honor the requested state timers from the UE, then at 1310, the UE receives default inactivity timers from the network whereas if the network does honor the requested state timers from the UE, then at 1312, the UE receives the UE requested timers. In any case, at 1314, the UE operates based upon the instructions received from the network.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of conserving battery power of a wireless device in communication with a wireless network, the method comprising:

determining a current operating state and an anticipated operating state of the wireless device;

determining a data traffic pattern required to adequately service the current operating state, the data traffic pattern comprising a plurality of data uploads and downloads between the wireless device and the wireless network;

generating a plurality of wireless device connection state transition timers in accordance with preserving battery power based upon the current operating state, the anticipated operating state, and the data traffic pattern, wherein each of the plurality of wireless device connection state transition timers indicates an amount of elapsed time of data inactivity at the wireless device required before a connection state of the wireless device is changed; and sending a wireless device connection state change request to the wireless network, the wireless device connection state change request including at least one of the plurality of wireless device connection state transition timers, wherein when the wireless network recognizes the wireless device connection state change request, the wireless network issues an instruction to change the wireless device's connection state according to a requested wireless device connection state transition timer, otherwise, the wireless network issues instructions to the wireless device to change the wireless device's connection state according to a network default connection state transition timer.

2. The method as recited in claim 1, wherein the anticipated operating state comprises an anticipated data traffic pattern.

3. The method as recited in claim 1, wherein sending the wireless device connection state change request to the wireless network comprises:

sending a change in a radio resource control (RRC) connection request by the wireless device to the wireless network;

causing a RRC connection state of the wireless device to change by the wireless network in response to the RRC connection request; and sending a RRC connection change acknowledgement message by the wireless device to the wireless network, wherein the RRC connection change acknowledgement message comprises an indication of the at least one of the plurality of wireless device connection state transition timers.

4. The method as recited in claim 1, wherein in response to a RadioBearerRelease message, the wireless device responds with a RadioBearerReleaseComplete message that comprises an indication of the at least one of the plurality of wireless device connection state transition timers.

5. The method as recited in claim 1, wherein in response to a RadioBearerReconfiguration message, the wireless device responds with a RadioBearerReconfigurationComplete message that comprises an indication of the at least one of the plurality of wireless device connection state transition timers.

6. The method as recited in claim 1, wherein in response to a TransportChannelReconfiguration message, the wireless device responds with a TransportChannelReconfigurationComplete message that comprises an indication of the at least one of the plurality of wireless device connection state transition timers.

7. The method as recited in claim 1, wherein in response to a PhysicalChannelReconfiguration message, the wireless device responds with a PhysicalChannelReconfigurationComplete message that comprises an indication of the at least one of the plurality of wireless device connection state transition timers.

8. The method as recited in claim 1, wherein either a HandoverToUTRANComplete message or a CellChangedOrderFromUTranFailure message comprises an indication of the at least one of the plurality of wireless device connection state transition timers.

9. The method as recited in claim 1, wherein in response to a UTRANMobilityInformation network message, the wireless device responds with a UTRANMobilityInformationConfirm message that comprises an indication of the at least one of the plurality of wireless device connection state transition timers.

10. The method as recited in claim 1, wherein in response to any of a CellUpdate network message and a URAUpdate network message, the wireless device responds with a UTRANMobilityInformationConfirm message that comprises an indication of the at least one of the plurality of wireless device connection state transition timers.

11. The method as recited in claim 1, wherein in response to a RRC Connection Reestablishment message, the wireless device responds with a RRCConnectionReestablishmentComplete message that comprises an indication of the at least one of the plurality of wireless device connection state transition timers.

12. The method as recited in claim 1, wherein in response to a RRC Connection Reconfiguration message, the wireless device responds with a RRCConnectionReconfigureationComplete message that comprises an indication of the at least one of the plurality of wireless device connection state transition timers.

13. A method of conserving battery power of a wireless device in communication with a wireless network, the method comprising:

determining a current operating state and an anticipated operating state of the wireless device;

determining a data traffic pattern required to adequately service the current operating state, the data traffic pattern comprising a plurality of data uploads and downloads between the wireless device and the wireless network;

determining a preferred wireless device connection state for the wireless device based upon the current operating state, the anticipated operating state, and the data traffic pattern; and sending a wireless device connection state change request instruction (SCRI) to the wireless network, the SCRI indicating the preferred wireless device connection state, wherein the wireless network responds by sending a state change command that causes the wireless device to transition from a current wireless device connection state to the preferred wireless device connection state.

14. The method as recited in claim 13, wherein when the SCRI indicates that the preferred device wireless connection state is CELL_PCH or URA_PCH, the wireless network causes the wireless device to transition to the CELL_PCH connection state or the URA_PCH connection state.

15. The method as recited in claim 13, wherein when the SCRI indicates that the preferred device wireless connection state is IDLE, the wireless network responds with a RRC_Connection_Release command that causes the wireless device to transition to the IDLE state.

16. The method as recited in claim 13, wherein when the SCRI indicates that the preferred wireless device connection state is CELL_FACH, the wireless network causes the wireless device to transition to the CELL_FACH connection state.

17. The method as recited in claim 16, further comprising in response to the wireless device determining an increase in data traffic, the wireless device determines that the preferred wireless device connection state is CELL_DCH and sends the SCRI requesting that the wireless network change the wireless device's connection state from the CELL_FACH connection state to the CELL_DCH connection state.

18. A wireless device in communication with a wireless network, the wireless device comprising:
- a processor;
- a battery; and
- a wireless transceiver arranged to facilitate communication with the wireless network, wherein the processor acts to conserve battery power by:
- determining a current operating state and an anticipated operating state of the wireless device;
- determining a data traffic pattern required to adequately service the current operating state, the data traffic pattern comprising a plurality of data uploads and downloads between the wireless device and the wireless network;
- generating a plurality of wireless device connection state transition timers in accordance with preserving battery power based upon the current operating state, the anticipated operating state, and the data traffic pattern, wherein each of the plurality of wireless device connection state transition timers indicates an amount of elapsed time of data inactivity at the wireless device required before a connection state of the wireless device is changed; and
- sending a wireless device connection state change request to the wireless network, the wireless device connection state change request including at least one of the plurality of wireless device connection state transition timers, wherein when the wireless network recognizes the wireless device connection state change request, the wireless network issues an instruction to update a wireless device connection state transition timer to a requested wireless device connection state transition timer, otherwise, the wireless network issues instructions to the wireless device to update the wireless device connection state transition timer to a network default connection state transition timer.

19. The wireless device as recited in claim 18, wherein the anticipated operating state comprises an anticipated data traffic pattern.

20. The wireless device as recited in claim 18, wherein sending the wireless device connection state change request to the wireless network comprises:
- sending a change in a radio resource control (RRC) connection request by the wireless device to the wireless network;
- causing a RRC connection state of the wireless device to change by the wireless network in response to the RRC connection request; and
- sending a RRC connection change acknowledgement message by the wireless device to the wireless network, wherein the RRC connection change acknowledgement message comprises an indication of the at least one of the plurality of wireless device connection state transition timers.

21. A wireless device in communication with a wireless network, the wireless device comprising:
- a processor;
- a battery; and
- a wireless transceiver arranged to facilitate communication with the wireless network, wherein the processor acts to conserve battery power by:
- determining a current operating state and an anticipated operating state of the wireless device;
- determining a data traffic pattern required to adequately service the current operating state, the data traffic pattern comprising a plurality of data uploads and downloads between the wireless device and the wireless network;
- determining a preferred wireless device connection state for the wireless device based upon the current operating state, the anticipated operating state, and the data traffic pattern; and
- sending a wireless device connection state change request instruction (SCRI) to the wireless network, the SCRI indicating the preferred wireless device connection state, wherein the wireless network responds by sending a state change command that causes the wireless device to transition from a current wireless device connection state to the preferred wireless device connection state.

22. The wireless device as recited in claim 21, wherein when the SCRI indicates that the preferred wireless device connection state is CELL_PCH or URA_PCH, the wireless network causes the wireless device to transition to the CELL_PCH connection state or the URA_PCH connection state.

23. The wireless device as recited in claim 21, wherein when the SCRI indicates that the preferred wireless device connection state is IDLE, the wireless network responds with a RRC_Connection_Release command that causes the wireless device to transition to the IDLE state.

24. The wireless device as recited in claim 21, wherein when the SCRI indicates that the preferred wireless device connection state is CELL_FACH, the wireless network causes the wireless device to transition to the CELL_FACH connection state.

25. The wireless device as recited in claim 24, wherein, in response to the wireless device determining an increase in data traffic, the wireless device determines that the preferred wireless device connection state is CELL_DCH and sends the SCRI requesting that the wireless network change the wireless device's connection state from the CELL_FACH connection state to the CELL_DCH connection state.

26. A non-transitory computer program product for storing executable computer code for conserving battery power of a wireless device in communication with a wireless network, the computer program product comprising:
- computer code for determining a current operating state and an anticipated operating state of the wireless device;
- computer code for determining a data traffic pattern required to adequately service the current operating state, the data traffic pattern comprising a plurality of data uploads and downloads between the wireless device and the wireless network;
- computer code for generating a plurality of wireless device connection state transition timers in accordance with preserving battery power based upon the current operating state, the anticipated operating state, and the data traffic pattern, wherein each of the plurality of wireless device connection state transition timers indicates an amount of elapsed time of data inactivity at the wireless device required before a connection state of the wireless device is changed; and
- computer code for sending a wireless device connection state change request to the wireless network, the wireless device connection state change request including at least one of the plurality of wireless device connection state transition timers,
- wherein when the wireless network recognizes the wireless device connection state change request, the wireless network issues an instruction to update a wireless device connection state transition timer to a requested wireless device connection state transition timer, otherwise, the wireless network issues instructions to the wireless device to update the wireless device connection state transition timer to a network default connection state transition timer.

27. The computer program product as recited in claim 26, wherein the anticipated operating state comprises an anticipated data traffic pattern.

28. The computer readable medium as recited in claim 26, wherein sending the wireless device connection state change request to the wireless network comprises:
- sending a change in a radio resource control (RRC) connection request by the wireless device to the wireless network;
- causing a RRC connection state of the wireless device to change by the wireless network in response to the RRC connection request; and
- sending a RRC connection change acknowledgement message by the wireless device to the wireless network, wherein the RRC connection change acknowledgement message comprises an indication of the at least one of the plurality of wireless device connection state transition timers.

29. The method as recited in claim 13, wherein the anticipated operating state comprises an anticipated data traffic pattern.

30. The wireless device as recited in claim 21, wherein the anticipated operating state comprises an anticipated data traffic pattern.

* * * * *